UNITED STATES PATENT OFFICE.

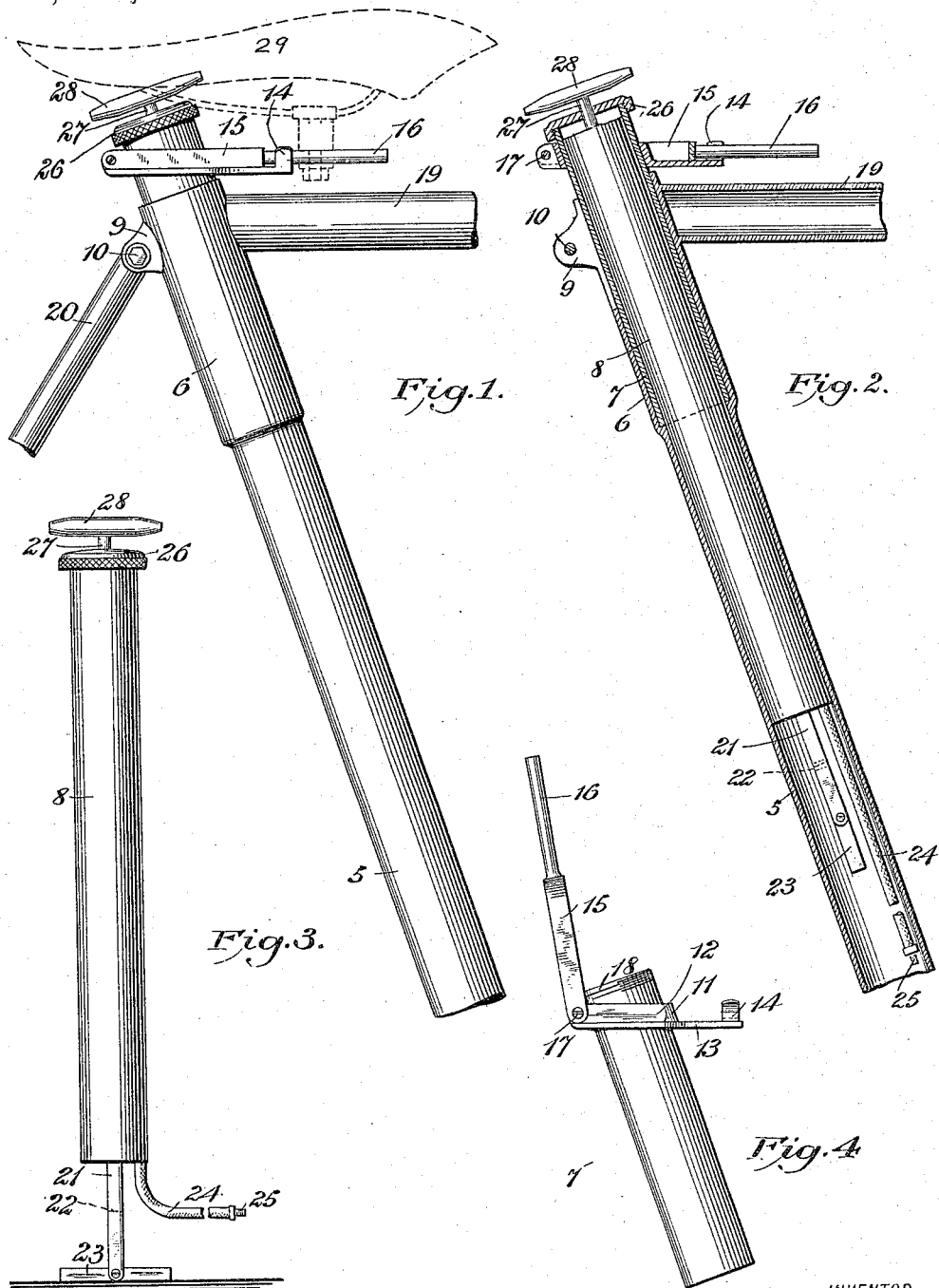

GEORGE ALOYSIUS MAGIN, OF ALBANY, NEW YORK.

MOUNTING FOR VELOCIPEDE-PUMPS.

1,163,429.

Specification of Letters Patent.

Patented Dec. 7, 1915.

Application filed June 25, 1914. Serial No. 847,218.

*To all whom it may concern:*

Be it known that I, GEORGE A. MAGIN, a citizen of the United States, residing at Albany, in the county of Albany and State of New York, have invented certain new and useful Improvements in Mountings for Velocipede-Pumps, of which the following is a full, clear, and exact description.

My invention relates to mountings for velocipede pumps, that is, to means for supporting the velocipede pump within the tubular frame of the machine, in such a manner that the pump is carried safely and held firmly in position while the machine is in use, but is also readily accessible and easy to remove for the purpose of inflating the tires of the velocipede. For the sake of simplicity, I show merely one representative form of my device, which, in this instance, is used upon a bicycle or a motor cycle.

Reference is made to the accompanying drawings forming a part of this specification, in which like letters indicate like parts.

Figure 1 is a fragmentary side elevation, showing my invention. Fig. 2 is a vertical section through the same. Fig. 3 shows the velocipede pump removed from its mounting and ready for action. Fig. 4 is a detail view, showing in side elevation the seat post and parts immediately associated therewith.

The tubular center post, or vertical stem of the velocipede frame appears at 5, and is provided with a portion 6 of enlarged diameter. Fitted into this portion is a seat post 7 of tubular form. The pump barrel or body portion of the pump appears at 8 and normally extends through the tubular seat post 7. The enlarged portions 6 of the tubular stem of the frame is split and provided with a pair of lugs 9. Extending through these lugs is a bolt 10. By turning this bolt, the lugs 9 are moved toward or from each other so as to hold the seat post 7 firmly in position, or to release it, as desired.

The seat post 7 carries an annular head 11, the latter being provided with a pair of oppositely disposed straight edges, one of which is shown at 12. The head 11 is further provided with an extending portion 13 carrying a spring clamp 14 of substantially U form. A yoke 15 is provided with a stem 16, the yoke and stem together having the general form of a fork, and being mounted upon a pivot bolt 17 which extends through the adjacent portion of the annular head 11. As the fork is swung upon the bolt 17 as a center, the stem 16 is brought into and out of engagement with the spring 14. The upper end of the seat post 7 is provided with a threaded portion 18 extending above the annular head 11. Connected rigidly with the portion 6 of the vertical stem of the bicycle frame is a front brace 19 of tubular form. A rear brace 20 constitutes a portion of the rear fork of the machine. Connected rigidly with the pump barrel 8 and extending axially from the same is a foot rest 21, provided with a slot 22. Pivotally connected with the foot rest 21 is a cross bar 23, this cross bar being normally in the position indicated in Fig. 2. When, however, the pump is removed from its mounting and ready for use, the cross bar 23 is brought into the position indicated in Fig. 3, and can then be rested upon the ground and engaged by the operator's foot.

A flexible tube 24 is connected with the pump barrel 8 and is provided with a threaded nipple 25 for connecting the pump with the tire to be inflated.

A cap 26, milled at its outer edge as shown, is threaded internally and screwed upon the adjacent end of the tubular seat post. By unscrewing the cap 26 through which projects the pump plunger 27 having a handle, the pump barrel can be disengaged and the entire pump thus removed, as may be understood from Fig. 3.

The saddle is shown by dotted lines at 29, and is mounted upon the stem 16. The operator, by swinging the seat 29 and yoke 15 in a contra-clockwise direction, according to Fig. 1, and disengaging the cap 26 from the threaded portion 18 of the seat post, can remove the pump from its mounting, and that, too, without otherwise disturbing the seat post.

In order to replace the pump, the operator merely drops it back into position, turns the cap 26, and swings the seat 29 and yoke 15 back into normal position.

I do not limit myself to the precise mechanism shown, as variations may be made therein without departing from the spirit of my invention.

Having thus described my invention, what

I claim as new and desire to secure by Letters Patent is as follows:

1. In a mounting for velocipede pumps, the combination of a vertical stem constituting part of a velocipede frame and provided with a portion of enlarged diameter, a tubular seat post extending into said portion of enlarged diameter and provided with an annular head and with a portion extending from said head, a clamp carried by the projecting portion of the head, a yoke pivotally mounted upon said head and provided with a seat carrying stem adapted to be engaged by the said clamp in order to hold the stem in position, a pump fitting into said tubular seat post, and means for securing said pump in said tubular seat post.

2. A device of the character described, comprising a tubular seat post provided adjacent its upper end with a head having a lateral projection, a yoke pivoted to the head opposite the projection thereof and provided with a stem for supporting a seat, means carried by the projection of the said head for locking the stem to said projection, an apertured and threaded cap screwing on the upper end of the seat post, and a pump in the seat post and having its plunger projecting through the aperture of said cap.

3. The combination of a tubular stem forming part of a velocipede frame, a tubular seat post extending into said stem and provided with a threaded portion, a yoke pivotally mounted upon said tubular seat post, a stem carried by said yoke for the purpose of supporting a velocipede seat so that said seat and said yoke may swing relatively to said tubular seat post, a pump barrel extending into said tubular seat post, and a cap through which the pump plunger projects provided with a threaded portion mating said threaded portion of said tubular seat post in order to secure said pump barrel in said tubular seat post.

In testimony whereof I have signed my name to this specification in the presence of two subscribing witnesses.

GEORGE ALOYSIUS MAGIN.

Witnesses:
 JOHN J. CONNERS,
 J. G. M. LEYNSH.

Copies of this patent may be obtained for five cents each, by addressing the "Commissioner of Patents, Washington, D. C."